United States Patent
Grewe et al.

(10) Patent No.: US 10,705,207 B2
(45) Date of Patent: Jul. 7, 2020

(54) CONTROL DEVICE, SERVER SYSTEM AND VEHICLE

(71) Applicant: Conti Temic microelectronic GmbH, Nürnberg (DE)

(72) Inventors: Ralph Grewe, Frankfurt am Main (DE); Stefan Hegemann, Wangen (DE); Stefan Heinrich, Achern (DE)

(73) Assignee: Vitesco Technologies Germany GmbH, Hannover (DE)

( * ) Notice: Subject to any disclaimer, the term of this patent is extended or adjusted under 35 U.S.C. 154(b) by 259 days.

(21) Appl. No.: 15/430,838

(22) Filed: Feb. 13, 2017

(65) Prior Publication Data

US 2017/0153326 A1 Jun. 1, 2017

Related U.S. Application Data

(63) Continuation of application No. PCT/DE2015/200405, filed on Jul. 9, 2015.

(30) Foreign Application Priority Data

Aug. 13, 2014 (DE) .......... 10 2014 216 008

(51) Int. Cl.
  *G01S 13/93* (2020.01)
  *G01S 13/86* (2006.01)
  (Continued)

(52) U.S. Cl.
  CPC ............ *G01S 13/931* (2013.01); *G01S 13/86* (2013.01); *G01S 13/867* (2013.01); *G01S 13/89* (2013.01);
  (Continued)

(58) Field of Classification Search
  CPC ........ G01S 13/867; G01S 13/86; G01S 13/89; G01S 13/931; G01S 2013/9342; G01S 2013/9346; G01S 2013/935; G01S 2013/9357; G01S 2013/936; G01S 2013/9371; G06K 9/00791; G06K 9/00818
  (Continued)

(56) References Cited

U.S. PATENT DOCUMENTS 6,924,762 B2  8/2005 Miyake et al.
7,634,107 B2  12/2009 Fujii
(Continued)

FOREIGN PATENT DOCUMENTS

DE       102 03 413 A1    8/2003
DE   10 2004 024 125 A1   8/2005
(Continued)

OTHER PUBLICATIONS

International Search Report and Written Opinion dated Mar. 17, 2016 from corresponding International Patent Application No. PCT/DE2015/200405.
(Continued)

*Primary Examiner* — Timothy X Pham

(57) ABSTRACT

A control device for a vehicle, with at least one environment sensor which is designed to detect the surroundings of the vehicle, with a computing device which is designed to detect the position of the vehicle and to operate the environment sensor on the basis of corresponding location-dependent operating parameters.

25 Claims, 2 Drawing Sheets

(51) Int. Cl.
  *G01S 13/89* (2006.01)
  *G01S 13/931* (2020.01)
  *G06K 9/00* (2006.01)

(52) U.S. Cl.
  CPC ..... *G06K 9/00791* (2013.01); *G06K 9/00818* (2013.01); *G01S 2013/9316* (2020.01); *G01S 2013/9318* (2020.01); *G01S 2013/9319* (2020.01); *G01S 2013/9322* (2020.01); *G01S 2013/9327* (2020.01); *G01S 2013/93185* (2020.01)

(58) Field of Classification Search
  USPC .......................................................... 342/70
  See application file for complete search history.

(56) References Cited

U.S. PATENT DOCUMENTS

| | | | |
|---|---|---|---|
| 8,620,032 | B2 | 12/2013 | Zeng |
| 9,524,438 | B2* | 12/2016 | Wedajo .............. G06K 9/00791 |
| 2004/0267452 | A1 | 12/2004 | Igarashi et al. |
| 2008/0024606 | A1 | 1/2008 | Kawasaki |
| 2008/0169966 | A1 | 7/2008 | Tsuchihashi et al. |
| 2010/0188288 | A1 | 7/2010 | Bahlmann et al. |
| 2011/0074956 | A1 | 3/2011 | Faber et al. |
| 2013/0321615 | A1* | 12/2013 | Schofield ............... B60Q 1/346 348/118 |
| 2015/0192657 | A1 | 7/2015 | Engel |
| 2015/0301172 | A1* | 10/2015 | Ossowska ............... G01S 7/023 342/70 |
| 2016/0364619 | A1* | 12/2016 | Ogata ................ G06K 9/00362 |
| 2017/0225678 | A1* | 8/2017 | Bariant ................. G01S 15/931 |
| 2017/0328729 | A1* | 11/2017 | Zhu ......................... G01S 7/497 |

FOREIGN PATENT DOCUMENTS

| | | |
|---|---|---|
| DE | 102004040208 A1 | 2/2006 |
| DE | 10 2006 005 443 A1 | 2/2007 |
| DE | 10 2007 034 657 A1 | 1/2008 |
| DE | 10 2008 002 026 A1 | 12/2009 |
| DE | 10 2008 040467 A1 | 1/2010 |
| DE | 10 2010 006 828 A1 | 8/2011 |
| DE | 10 2012 207 620 A1 | 12/2012 |
| EP | 1763229 A2 | 3/2007 |
| JP | H0-205 645 | 5/1997 |
| WO | 2014008968 A1 | 1/2014 |

OTHER PUBLICATIONS

Deutsches Patent Office Search Report dated Mar. 2, 2015 from corresponding German Patent Application 10 2014 216 008.1.

* cited by examiner

CONTROL DEVICE, SERVER SYSTEM AND VEHICLE

CROSS REFERENCE TO RELATED APPLICATIONS

This U.S. patent application claims the benefit of PCT patent application No. PCT/DE2015/200405, filed Jul. 9, 2015, which claims the benefit of German patent application No. 10 2014 216 008.1, filed Aug. 13, 2014, both of which are hereby incorporated by reference.

TECHNICAL FIELD

The present invention relates to a control device for a vehicle, a corresponding server system and a corresponding vehicle.

BACKGROUND

Nowadays, modern vehicles are provided with numerous electronic systems, which assist the driver in handling the vehicle. Driver assistance systems can for example help the driver stay in lane if they are distracted, or can initiate an automatic braking maneuver on their behalf.

One type of driver assistance system takes control of the vehicle from the driver. Such driver assistance systems allow what is referred to as autonomous or highly-automated vehicle guidance, e.g. without driver intervention.

Such driver assistance systems generally use satellite navigation systems installed in the vehicle and suitable sensor technology to determine the position of the vehicle and to control the vehicle. The navigation system here allows a destination, for example, to be specified.

In such situations, the driver assistance system takes control of the transversal and longitudinal guidance of the vehicle. The driver is, however, called upon to take over driving if necessary.

The sensor technology installed in the vehicle normally comprises, for example, a radar sensor and a camera. The problem here is that a radar can have difficulty, for example in a tunnel, with sensing the environment. By way of example, the radar can receive echo signals from the roof and walls. A camera can be disturbed, for example, on entering and leaving a tunnel, because when entering the tunnel the picture is too dark and on leaving the tunnel the camera becomes blinded.

Such problems with detecting the environment need to be avoided.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

A control device for a vehicle, with at least one environment sensor which is designed to detect the surroundings of the vehicle, with a computing device which is designed to detect the position of the vehicle and to operate the environment sensor on the basis of corresponding location-dependent operating parameters.

A server system with a parameter memory which is designed to store location-dependent and/or time-dependent operating parameters for at least one environment sensor, and with a first data interface, which is designed to couple the server system to a control device according to the invention in a data communications link.

A vehicle with a control device according to the invention, and with a driver assistance system which is designed to control the vehicle at least on the basis of a map provided by the control device.

Immutable conditions represented, for example, by tunnels or bridges on the highway to be travelled by a vehicle can influence the quality of the environment detection.

The operating parameters for the environment sensors of the vehicle are adapted or changed in a location-dependent manner, as a function of the position or geographical location of the vehicle.

Here the operating parameters for the environment sensors should be understood to be all parameters relating to the actual sensors and to the signal processing algorithms in the signal chain. Here the signal processing algorithms can be executed in processing units of the actual environment sensors or in downstream processing units, for example of vehicle controllers.

If the operating parameters of the computing device are adapted according to the current position of the vehicle, then problems with environment detection by the environment sensors can be consequently reduced or avoided.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DETAILED DESCRIPTION

Figure 1:
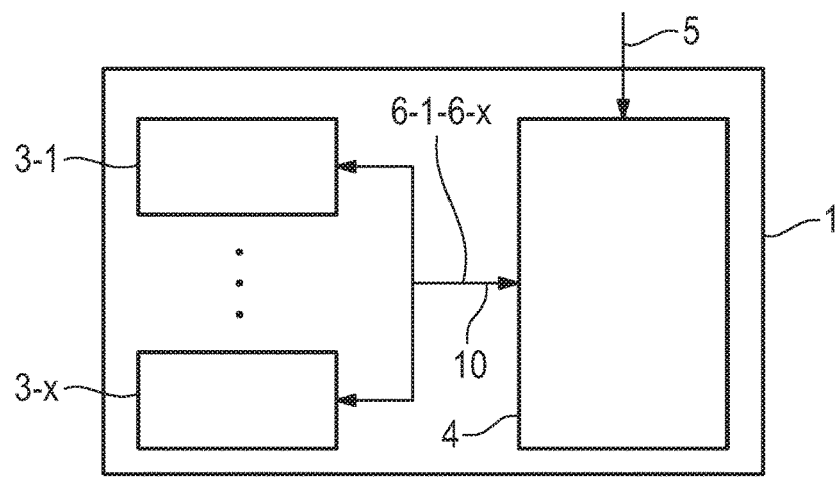
FIG. 1 is a schematic illustration of an embodiment of a control device of the present invention for a vehicle.

In one embodiment, the control device comprises a parameter memory which is designed to store the location-dependent operating parameters for the at least one environment sensor. This allows simple management of the operating parameters.

In one embodiment, at least one operating parameter is also configured as a time-dependent operating parameter. The computing device is also configured to operate the environment sensor on the basis of the corresponding location-dependent and/or time-dependent operating parameters. This allows, for example, account to be taken of the expected weather conditions at certain times of the day or year when determining the operating parameters. By way of example, the time of day or the year can influence the light conditions greatly. This influence can thus be taken into consideration.

In one embodiment, the control device comprises a map memory which is designed to store a map of the surroundings of the vehicle. The computing device is also configured to update the map based on measured values from the environment sensor. If a map of the vehicle environment is created based on the sensors operated with the corresponding operating parameters, a highly-detailed map can be created.

In one embodiment, the environment sensor is configured as a radar sensor. This allows objects to be detected even in the dark.

In one embodiment, at least one operating parameter characterizes a minimum signal-to-noise ratio for the identification of an object. In this way, for example, reflections of radar signals from tunnel walls and roofs can be distinguished from actual objects.

In one embodiment, at least one operating parameter characterizes a functional parameter particularly for a linear conversion function for converting a signal-to-noise ratio into an occupation probability. Linear conversion functions are preferably used to calculate, on the basis of a signal-to-noise ratio, whether a point in the vehicle environment is occupied by an object or not, and as a result a specific adaptation of the conversion to various environmental conditions can take place, thereby reducing false detections. It is obvious to a person skilled in the art that this can also be extended to non-linear conversion functions.

In one embodiment, at least one operating parameter characterizes a transmission power of the radar sensor and/or a range of the radar sensor. This allows a simple adaptation of the environment detection to different conditions.

In one embodiment, the environment sensor is configured as a camera. This allows the identification of objects and particularly, for example, the color of objects too. This is important, for example, to allow identification of a red traffic light.

In one embodiment, at least one operating parameter characterizes a functional parameter for a conversion function for calculating an occupation probability from a camera image. Since linear conversion functions are normally used to calculate, on the basis of a camera image, whether a point in the vehicle environment is occupied by an object or not, as a result a specific adaptation of the conversion to various environmental conditions can take place, thereby reducing false detections.

In one embodiment, at least one operating parameter comprises an exposure parameter for controlling the camera exposure. This allows the camera exposure to be adapted to changing exposure conditions.

In one embodiment, at least one operating parameter comprises a threshold value for an edge identification in a camera image. This allows a simple adaptation of the environment identification to different conditions.

In one embodiment, at least one operating parameter characterizes a minimum number of object features, necessary for positive identification of an object type. This allows a simple adaptation of the environment detection to different conditions. Here, object features are particularly features of the objects which can be automatically extracted, for example using signal processing algorithms, from the measured values.

In one embodiment, at least one operating parameter comprises position information on traffic lights and/or traffic signs or similar. This allows, for example at night, a traffic light to be identified simply by the color of the illuminated signal, even if the camera cannot identify any geometrical structure in the darkness.

In one embodiment, the operating parameters also have type-dependent operating parameters. This allows, for various types of similar sensors, suitable parameters to be saved. By way of example, operating parameters for a plurality of different radar sensors can be saved.

In one embodiment, the computing device and the at least one environment sensor are arranged in the vehicle. The computing device is also configured to retrieve data from the parameter memory via a network, particularly the Internet. Physical separation of the parameter memory and the other components of the computing device is thus possible. This allows centralized management of the operating parameters.

In one embodiment, the parameter memory is configured as a decentralized memory, comprising a plurality of memory storage media. This allows the operating parameters to be held in a decentralized way, for example in a cloud system or similar, where they are likely to be needed or retrieved.

In one embodiment, the vehicle comprises a second data interface, which is designed to couple the computing device via a data communications link to a server system according to the invention. This allows simple communication between the control device and the server system. The second data interface can also be used in the vehicle by other systems.

Unless otherwise stated, all the figures use the same reference numerals for identical or functionally identical devices.

FIG. 1 shows a block diagram of an embodiment of a control device 1. The control device 1 comprises a plurality of environment sensors 3-1-3-$x$, of which only the first environment sensor 3-1 and the last environment sensor 3-$x$ are shown. Further environment sensors are indicated by three dots.

The environment sensors 3-1-3-$x$ are coupled to a computing device 4. The computing device 4 is configured, to determine the position 5 of the vehicle 2, in which the control device 1 is arranged. The computing device 4 can for example be coupled to a GPS system of the vehicle 2, in order to detect the position 5 of the vehicle 2. Alternatively, a system already present in the vehicle 2 can transmit the positions of the vehicle 2 to the computing device 4. In principle, the computing device 4 can use any possible type of localization of the vehicle 2, without the type of localization affecting the functioning of the control device 1.

If the computing device 4 has determined the position 5 of the vehicle 2, the computing device 4 operates the environment sensors 3-1-3-$x$ based on a set of location-dependent operating parameters 6-1-6-$x$.

Operating parameters 6-1-6-$x$ are the parameters which are necessary for operating the environment sensors 3-1-3-$x$. Here, operation of the environment sensors 3-1-3-$x$ also means operation of the signal processing chain, which evaluates the measured values 10 of the environment sensors 3-1-3-$x$.

Location-dependent operating parameters 6-1-6-$x$ accordingly represent operating parameters which are merely intended to be used in a specified local area for operation of the environment sensors 6-1-6-$x$. Here, the location-dependent operating parameters 6-1-6-$x$ are associated not just with a single location but also a local area, such as a section of a highway or an area of a specified size. The area can for example be defined by a mid-point and a radius or by the coordinates of three or more corner points.

If, for a position 5 of the vehicle 2, no location-dependent operating parameters 6-1-6-$x$ are available, general operating parameters or the location-dependent operating parameters 6-1-6-$x$ available for the preceding position 5 can be used for operation of the environment sensors 3-1-3-$x$.

The location-dependent operating parameters 6-1-6-$x$ can, in one embodiment, also be at least partially dependent on the time or season. Alternatively, the location-dependent operating parameters 6-1-6-$x$ can, in one embodiment, also be at least partially dependent on the weather or similar.

Since with a camera 3-3 (see FIG. 3) the brightness has a decisive influence on the exposure setting, for a camera 3-3, the operating parameter 6-1-6-$x$ can, for example, be set as a function of the daytime exposure setting. Similarly, an imminent entry of a vehicle 2 in a tunnel can be detected and the location-dependent operating parameter 6-1-6-$x$, which indicates the exposure setting of the camera 3-3 in the tunnel, can be used to operate the camera 3-3.

A further example of a time-dependent and location-dependent operating parameter can, for example, be the identification of a traffic light or its position. If a vehicle 2 is moving in darkness, using the position 5 of the vehicle 2, a traffic light on the highway along which the vehicle 2 is travelling can, for example, be detected.

Although during darkness, the camera 3-3 cannot detect the outlines and thus the structure of the traffic light, by means of the corresponding location-dependent operating parameters 6-1-6-$x$ it is possible to inform the signal processing function for the camera image, that a traffic light is located in the field of vision of the camera 3-3. This allows just a small number of pixels, which are for example red, to be identified as a red traffic light. Such a location-dependent operating parameter 6-1-6-$x$ can even be used during the day to increase the traffic light detection range.

Further possible location-dependent and/or time-dependent operating parameters 6-1-6-$x$ are, for example, operating parameters 6-1-6-$x$, characterizing a functional parameter for a conversion function for calculating an occupation probability from a camera image, operating parameters 6-1-6-$x$, having a threshold value for an edge identification in a camera image, operating parameters 6-1-6-$x$, characterizing a minimum number of object features, necessary for positive identification of an object type, or operating parameters 6-1-6-$x$, having positional information on traffic signs. Further location-dependent and/or time-dependent operating parameters 6-1-6-$x$ are similarly possible.

Figure 3:
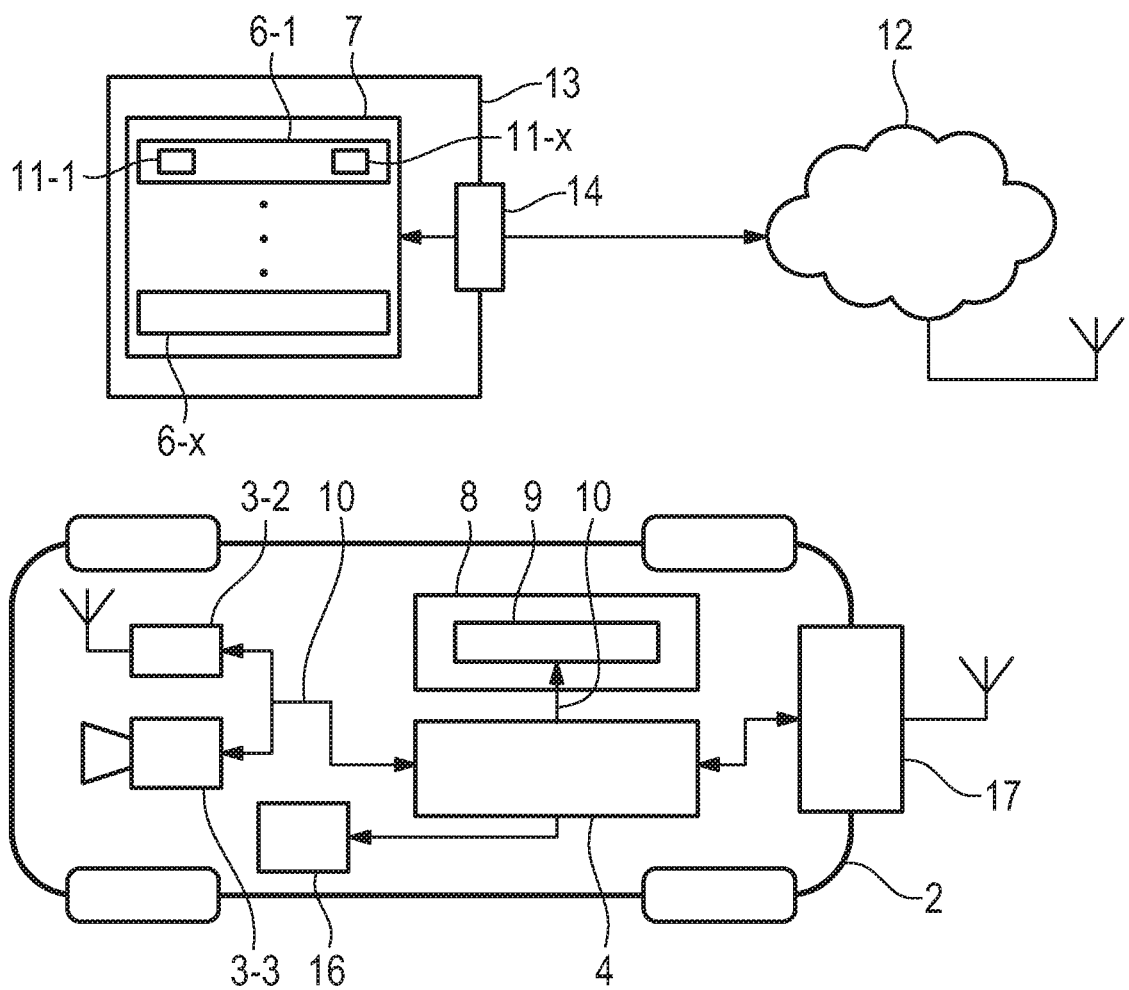
FIG. 3 is a third schematic illustration of a control device of the present invention for a vehicle.

In one embodiment, one of the environment sensors 3-1-3-$x$ can be configured as a radar sensor 3-2 (see FIG. 3). In such an embodiment the location-dependent and/or time-dependent operating parameters 6-1-6-$x$ can, for example, be operating parameters 6-1-6-$x$, characterizing a minimum signal-to-noise ratio for the identification of an object or a functional parameter for a linear conversion function for converting a signal-to-noise ratio into an occupation probability or characterizing a transmission power of the radar sensor and/or a range of the radar sensor. Further location-dependent and/or time-dependent operating parameters 6-1-6-$x$ are similarly possible.

In a further embodiment, the location-dependent and/or time-dependent operating parameter 6-1-6-$x$ can also have type-dependent operating parameters 11-1-11-$x$. Type-dependent means that for individual types of environment sensors 3-1-3-$x$ of the same nature, in each case different location-dependent and/or time-dependent operating parameters 6-1-6-$x$ are specified. Environment sensors 3-1-3-$x$ of the same type means that, for example, for different types of radar sensor or different types of cameras, location-dependent and/or time-dependent operating parameters 6-1-6-$x$ are specified.

The location-dependent and/or time-dependent operating parameters 6-1-6-$x$ can be stored in one embodiment in a parameter memory 7 in the vehicle 2. Such a parameter memory 7 can, for example, be integrated into the database of a navigation system of the vehicle 2.

Alternatively, however, the location-dependent and/or time-dependent operating parameters 6-1-6-$x$ can also be stored in a central parameter memory 7, for example in a back-end or a central server.

The term operating parameters 6-1-6-$x$ is intended to mean generally all variables in the signal processing system or the signal processing chain of the control device 1.

Figure 2:
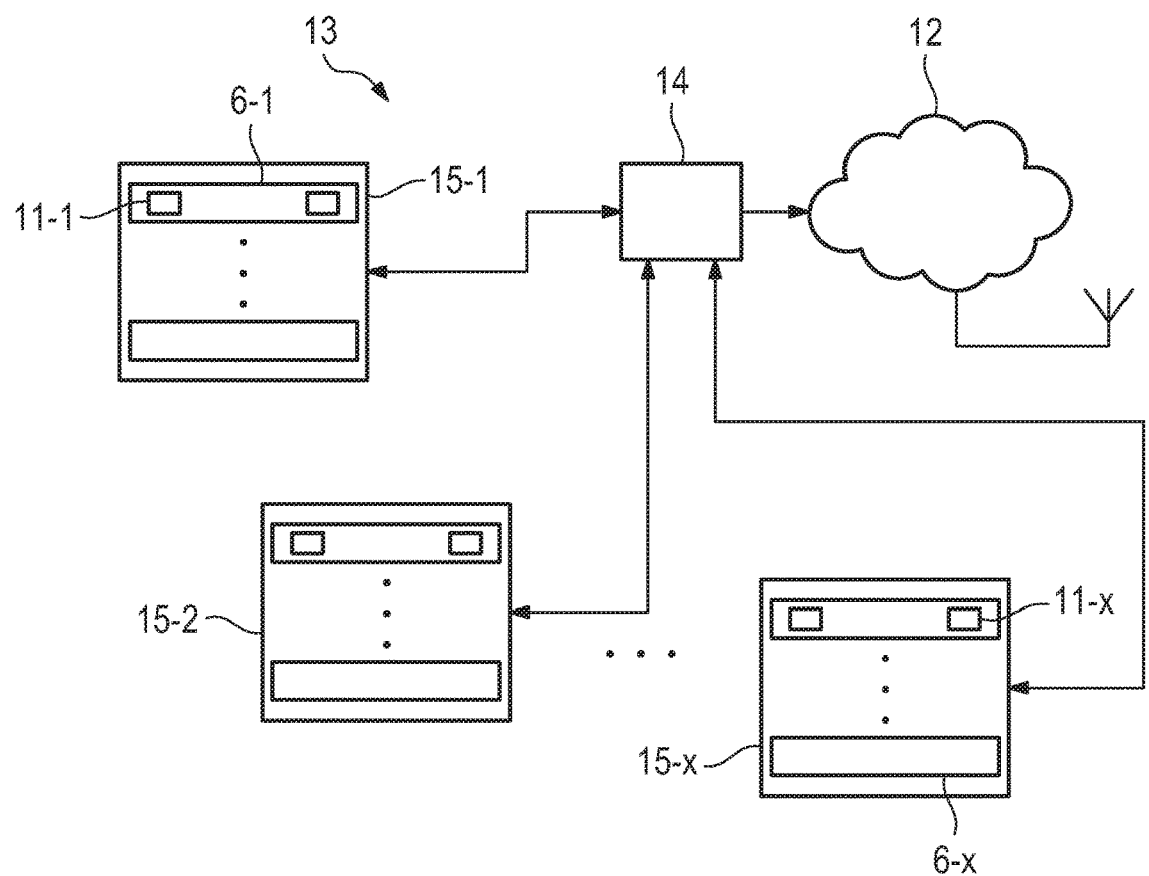
FIG. 2 is another schematic illustration of a server system of the present invention for use with a vehicle.

FIG. 2 shows a block diagram of an embodiment of a server system 13. The server system 13 comprises a plurality of storage media 15-1-15-$x$ which together form the parameter memory 7. The individual storage media 15-1-15-$x$ are coupled to a common first data interface 14, via which the server system 13 is coupled to a Network 12, for example the Internet 12. FIG. 2 also shows an antenna symbol, which is merely intended to illustrate that a wireless data link between the server system 13 and a control device 1 of a vehicle 2 can be established.

The individual storage media 15-1-15-$x$ in each case comprise the location-dependent and/or time-dependent operating parameters 6-1-6-$x$. Some of the location-dependent and/or time-dependent operating parameters 6-1-6-$x$ also comprise type-dependent operating parameters 11-1-11-$x$.

The server system 13 in FIG. 2 is shown as a decentralized server system 13 with a plurality of storage media 15-1-15-$x$. Here, each of the storage media 15-1-15-$x$ can, for example, be a dedicated server 15-1-15-$x$. The individual servers 15-1-15-$x$ can be coupled together via suitable software, so that when accessing the location-dependent and/or time-dependent operating parameters 6-1-6-$x$ it is unclear to the control device 1, which server 15-1-15-$x$ is providing the location-dependent and/or time-dependent operating parameters 6-1-6-$x$. In such an embodiment, the server system 13 can be likened to a cloud system.

Alternatively, the server system 13 can also comprise a central parameter memory 7, for example a central server 7, in which the location-dependent and/or time-dependent operating parameters 6-1-6-$x$ are stored.

FIG. 3 shows a block diagram of an embodiment of a vehicle 2. The vehicle 2 comprises a control device 1 which, for the sake of clarity, is not shown separately. Rather, the individual components of the control device 1 are shown in FIG. 2.

The vehicle 2 comprises a computing device 4, coupled to a radar sensor 3-2 and a camera 3-3, representing the environment sensors 3-2, 3-3 of the vehicle 2. The computing device 4 is also coupled to a map memory 8, comprising a map 9 of the surroundings of the vehicle 2. Finally, the computing device 4 is coupled to a second data interface 17 of the vehicle 2, which indirectly couples the computing device wirelessly in a data communications link to a server system 13 via the Internet 12.

The server system 13 comprises a first data interface 14, via which the parameter memory 7 of the server system 13 is coupled to the Internet 12. In contrast to FIG. 2 the server system 13 comprises just one parameter memory 7, implemented in an individual system, for example a server.

The vehicle 2 also comprises a driver assistance system 16, coupled to the computing device 4 so that it can retrieve the map 9 from this. The driver assistance system 16 can, for example, be a system for highly-automated or autonomous control of the vehicle 2. In further embodiments, however, the driver assistance system 16 can be any system in the vehicle 2 which needs or can use the map 9. The link between the control device 1 and the driver assistance system 16 can, for example, be established via a vehicle bus, for example a CAN bus, or a FlexRay bus. Alternatively, the link between the control device 1 and the driver assistance system 16 can also be established discretely. Alternatively, the computing device 4 can cyclically output data from the map 9 on a vehicle bus.

To keep the map 9 up to date, the computing device 4 evaluates the data from the environment sensors 3-1-3-x, thus the radar sensor 3-2 and the camera 3-3, of the vehicle 2, and based on the measured values 10 or the data from the radar sensor 3-2 and the camera 3-3, creates an updated map 9 in the map memory 8. The map 8 is, in one embodiment, configured as a highly accurate occupation map of the surroundings of the vehicle 2, e.g. the map comprises information on objects positioned around the vehicle 2. The driver assistance system 16 can use this information, for example during autonomous guidance of the vehicle 2, to avoid a collision with the objects.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A control device for a vehicle comprising:
   at least one environment sensor to detect the surroundings of the vehicle; and
   a computing device which detects a position of the vehicle, assigns a set of location-dependent operating parameters based on the position of the vehicle, and operates the environment sensor based on the corresponding location-dependent operating parameters,
   wherein at least one operating parameter characterizes a functional parameter particularly for a linear conversion function for converting a signal-to-noise ratio into an occupation probability.

2. The control device according to claim 1, wherein a parameter memory stores the location-dependent operating parameters for the at least one environment sensor.

3. The control device according to claim 2, wherein the computing device and the at least one environment sensor are arranged in the vehicle; and wherein the computing device is configured to retrieve data from the parameter memory via a network.

4. The control device according to claim 1, wherein the at least one operating parameter is a time-dependent operating parameter and the computing device operates the environment sensor based on at least one of the corresponding location-dependent operating parameters and time-dependent operating parameters.

5. The control device according to claim 1, wherein a map memory stores a map of the surroundings of the vehicle and, wherein the computing device is configured to update the map based on measured values from the environment sensor.

6. The control device according to claim 5, wherein at least one operating parameter characterizes a minimum signal-to-noise ratio for the identification of an object.

7. The control device according to claim 5, wherein at least one operating parameter characterizes at least one of a transmission power of the radar sensor and a range of the radar sensor.

8. The control device according to claim 1, wherein the environment sensor is a radar sensor.

9. The control device according to claim 1, wherein the environment sensor is a camera.

10. The control device according to claim 9, wherein at least one operating parameter characterizes a functional parameter for a conversion function for calculating an occupation probability from a camera image.

11. The control device according to claim 9, wherein at least one operating parameter comprises an exposure parameter for controlling the camera exposure.

12. The control device according to claim 9, wherein at least one operating parameter comprises a threshold value for edge identification in a camera image.

13. The control device according to claim 9, wherein at least one operating parameter characterizes a minimum number of object features, necessary for positive identification of an object type.

14. The control device according to claim 9, wherein at least one operating parameter comprises position information on at least one of traffic lights and traffic signs.

15. The control device according to claim 1, wherein the operating parameters also comprise type-dependent operating parameters.

16. The control device according to claim 1, wherein the position of the vehicle is an absolute position of the vehicle.

17. The control device according to claim 16, wherein the absolute position of the vehicle is one of a local area associated with the absolute position of the vehicle and an area of a specified size associated with the absolute position of the vehicle.

18. A server system comprising:
    a parameter memory which is designed to store at least one of a location-dependent and a time-dependent operating parameter for at least one environment sensor, wherein the location-dependent parameter is associated with an absolute location; and
    a first data interface, which is designed to couple the server system to a control device according to one of the above claims in a data communications link,
    wherein one of the at least one location-dependent operating parameter and the time-dependent operating parameter comprises an exposure parameter for controlling camera exposure of a camera coupled to or forming part of the control device.

19. The server system according to claim 18, wherein the parameter memory is configured as a decentralized memory, comprising a plurality of storage media.

20. The server system according to claim 18, wherein the absolute position of the vehicle is one of a local area associated with the absolute position of the vehicle and an area of a specified size associated with the absolute position of the vehicle.

21. A vehicle comprising:
    a control device having at least one environment sensor to detect surroundings of the vehicle and a computing device which detects an absolute position of the vehicle, assigns a set of location-dependent operating parameters based on the absolute position of the vehicle, and operates the environment sensor based on the corresponding location-dependent operating parameters; and a driver assistance system which is designed to control the vehicle at least on the basis of a map provided by the control device, wherein one location-dependent operating parameter characterizes a minimum number of object features, necessary for positive identification of an object type by the control device.

22. The vehicle according to claim 21, further comprising:

a control device in communication with a server system;

a parameter memory for the server system which is designed to store at least one of a location-dependent and a time-dependent operating parameter for at least one environment sensor; and a first data interface, which is designed to couple the server system to the control device in a data communications link.

23. The server system according to claim 22, wherein the parameter memory is configured as a decentralized memory, comprising a plurality of storage media.

24. The vehicle according to claim 21, wherein the absolute position of the vehicle is one of a local area associated with the absolute position of the vehicle and an area of a specified size associated with the absolute position of the vehicle.

25. The vehicle according to claim 21, wherein the at least one environment sensor comprises a camera, and another location-dependent operating parameter 1) characterizes one of a functional parameter particularly for a linear conversion function for converting a signal-to-noise ratio into an occupation probability, or 2) comprises an exposure parameter for controlling exposure of the camera.

* * * * *